United States Patent
Leigh et al.

(10) Patent No.: US 10,502,910 B2
(45) Date of Patent: Dec. 10, 2019

(54) TRANSCEIVER MODULES

(71) Applicant: Hewlett Packard Enterprise Development LP, Houston, TX (US)

(72) Inventors: Kevin B. Leigh, Houston, TX (US); Alan L. Goodrum, Tomball, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/747,176

(22) PCT Filed: Jul. 30, 2015

(86) PCT No.: PCT/US2015/042971
§ 371 (c)(1),
(2) Date: Jan. 24, 2018

(87) PCT Pub. No.: WO2017/019099
PCT Pub. Date: Feb. 2, 2017

(65) Prior Publication Data
US 2018/0210158 A1    Jul. 26, 2018

(51) Int. Cl.
*G02B 6/42* (2006.01)
*G06F 1/26* (2006.01)
*G02B 6/38* (2006.01)

(52) U.S. Cl.
CPC ......... *G02B 6/4293* (2013.01); *G02B 6/3817* (2013.01); *G02B 6/4245* (2013.01);
(Continued)

(58) Field of Classification Search
CPC .............................. G02B 6/3817; G02B 6/4293
See application file for complete search history.

(56) References Cited

U.S. PATENT DOCUMENTS 6,931,183 B2    8/2005  Panak
6,952,532 B2 *  10/2005 Dair ..................... G02B 6/4214
                                                            385/88
(Continued)

FOREIGN PATENT DOCUMENTS

EP          2408119          1/2012

OTHER PUBLICATIONS

"Install an SFP+ or QSFP Optical Transceiver Module" Oracle, Oct. 2011, 1 pp., <https://docs.oracle.com/cd/E19285-01/html/E21394/z40001011307751.html>.

(Continued)

*Primary Examiner* — Omar R Rojas
(74) *Attorney, Agent, or Firm* — Sheppard Mullin Richter & Hampton LLP (57) ABSTRACT

Examples of transceiver module assemblies may comprise a first transceiver module engaged with a first electrical device and including a first transceiver, a second transceiver module engaged with a second electrical device and including a second transceiver, and an electro-optical cable to connect the first transceiver module to the second transceiver module. The first transceiver module may receive an electrical signal and electrical power from the first electrical device, and the first transceiver may convert the electrical signal to an optical signal. The electro-optical cable may separately transmit the optical signal and the electrical power from the first transceiver module to the second transceiver module. The second transceiver may convert the optical signal back to the electrical signal and provide the converted electrical signal to the second electrical device.

14 Claims, 2 Drawing Sheets

(52) U.S. Cl.
CPC ......... *G02B 6/4246* (2013.01); *G02B 6/4274* (2013.01); *G06F 1/26* (2013.01)

(56) References Cited

U.S. PATENT DOCUMENTS

| | | | |
|---|---|---|---|
| 7,350,984 B1 | 4/2008 | Togarni | |
| 7,580,638 B2 | 8/2009 | Aronson | |
| 7,824,113 B2 | 11/2010 | Wong | |
| 7,918,011 B2 | 4/2011 | Hudgins | |
| 8,083,417 B2* | 12/2011 | Aronson | G02B 6/3817 385/14 |
| 8,233,804 B2 | 7/2012 | Aguren | |
| 8,824,838 B2* | 9/2014 | Walker | G06F 13/4086 385/14 |
| 9,473,361 B2* | 10/2016 | Coffey | H04L 41/0803 |
| 2009/0160486 A1* | 6/2009 | Lee | H04L 25/0272 326/82 |
| 2009/0285580 A1 | 11/2009 | Yasuda | |
| 2011/0208541 A1* | 8/2011 | Wilson | A61G 7/018 705/3 |
| 2013/0272348 A1* | 10/2013 | Lai | H04B 3/00 375/219 |
| 2014/0226991 A1 | 8/2014 | Hui | |
| 2014/0258742 A1 | 9/2014 | Chien | |
| 2015/0078740 A1 | 3/2015 | Sipes | |

OTHER PUBLICATIONS

Senko Advanced Components—IP-One: Optical 'N' Electrical, 2015, pp. 1-2, Senko Advanced Components, Inc.

* cited by examiner

TRANSCEIVER MODULES

BACKGROUND

Electrical devices, such as computing devices, may need to be electrically connected to each other, or be in electrical communication, such that one computing device can send an electrical signal, and another computing device can receive the sent electrical signal. Electrical signals may be transmitted from one computing device to another using an electrical cable. The electrical cable may have an electrical connector on each end of the cable to connect to the transmitting and the receiving computing devices. Further, electrical devices such as computing devices may communicate with other electrical devices using optical communication. A computing device may transmit an optical signal to another computing device, which may receive the optical signal.

DETAILED DESCRIPTION

Electrical devices may electrically communicate with other electrical devices. In some situations, electrical devices may electrically communicate with multiple other electrical devices, and, sometimes, a large number of other electrical devices. Electrical devices may electrically communicate with other electrical devices through electrical cables. Each electrical cable may engage with an electrical communication port on a first electrical device on one end of the cable, and, additionally, each electrical cable may engage with a second electrical communication port on a second electrical device on the other end of the cable. Electrical devices may employ electrical cables to electrically communicate with one or more other electrical devices that may be relatively far from the first electrical device. In such a situation, the electrical cables that are employed may be of a larger gauge or diameter than would be used if the electrical devices were closer together. This larger gauge of wire may increase the portion of the volume within a system that is occupied by the electrical cables. Further, signal conditioning circuitry, such as signal repeaters, may be used to maintain signal integrity across the increased length of the electrical connection between the electrical devices, thus also increasing the occupied volume and power consumption of the system.

Additionally, electrical devices may optically communicate with other electrical devices. Electrical devices may maintain optical communication by one electrical device transmitting an optical signal through the optical fibers of an optical cable, and another electrical device receiving the optical signal, and vice versa. In some situations, an electrical device may optically communicate with multiple other electrical devices by using multiple optical cables. Further, an electrical device may optically communicate with multiple other electrical devices by using a single optical cable containing a sufficient number of optical fibers to carry multiple optical signals to the multiple other electrical devices. In some situations, such an optical cable may be referred to as an optical trunk cable. Additionally, some electrical devices may be in electrical communication with other electrical devices through the use of optical signal communication. In such a situation, an electrical device may have a transceiver to convert an electrical signal to an optical signal, and vice versa. The optical signal may then be sent through an optical cable to a receiving electrical device. The receiving electrical device may have another transceiver to convert the transmitted optical signal back to the electrical signal to complete the electrical communication with the transmitting electrical device.

In some situations, it may be desirable to have a first electrical device electrically communicate with multiple second electrical devices. The multiple second electrical devices may be disposed in a rack, which may be located relatively far away from the first electrical device. Additionally, it may be desirable to have the first electrical device electrically communicate with multiple second electrical devices that are disposed in different racks, with each rack in a different location Employing an electrical cable from the first electrical device to connect with each of the second electrical devices may occupy a large volume within the overall system. Further, the increased diameter of each electrical cable due to the relatively far distance between the first and second electrical devices, as well as the inclusion of any signal condition circuitry, may further increase the occupied volume by the cabling within the overall system, as well as increase the cost of such cabling.

Additionally, employing an optical cable from the first electrical device to connect with each of the second electrical devices may also, similar to electrical cabling, increase the occupied volume by optical cabling within the system. This increased number of optical cables also increases the cost of the cabling. Further, the first electrical device may not have enough optical connectors to employ a dedicated optical cable for each of the second electrical devices. As mentioned above, an optical trunk cable may be employed to enable optical communication between the first electrical device and multiple second electrical devices, using a high-density optical connector on the first electrical device. The desired electrical signals may be converted to optical signals within the first electrical device, however, the optical signals then need to be converted back to electrical signals for each of the second electrical devices. Optical fibers within an optical trunk cable may be split off into multiple optical cables. Each of the split optical cables may couple to an optical transceiver of an electrical device, which may be more expensive than using a single, larger optical transceiver. A pass-through module may be disposed in each rack of second electrical devices and have one or more transceivers, powered by a local power source, to convert the optical signals from the first electrical device back to electrical signals, receivable by each of the second electrical devices disposed on that rack. The electrical signals may be transmitted from the pass-through module in each rack to the second electrical devices in that rack by electrical cables. A pass-through module may include one or more media-converter modules or multi-channel media converter modules, one or multiple optical transceivers, management logic, cooling fans, a local power supply and a power cord to connect to a power source in a rack.

However, if the pass-through module were to experience a failure or a malfunction, each of the second electrical devices engaged with the pass-through module would no longer be in electrical communication with the first electrical device. Additionally, in order to service or replace the pass-through module, the transceivers within, or the transceivers within the first electrical device, the pass-through module and/or the first electrical device, respectively, may need to be shut down, thereby ceasing electrical communication with some or all of the second electrical devices.

Further, the pass-through module may use a power supply and/or a power cord to connect to external power, through outlets disposed in the rack, in order to convert the optical signals back to electrical signals using the transceivers within the pass-through module. This single power source may create another possible source of failure that would cease electrical communication between the first electrical device and all of the second electrical devices within that rack. Moreover, there may be multiple pass-through modules disposed within a rack, each with its own power supply and/or power cord, for which there may not be enough outlets in the rack. Each pass-through module, as well as its power supply and/or power cord, may occupy volume within a rack of second electrical devices. This occupied volume may otherwise be used to increase the number of second electrical devices, or, in other words, increase the density of the rack of second electrical devices.

Additionally, the number of second electrical devices within a rack may vary from rack to rack. Thus, a pass-through module may not, in some racks, have the right number of electrical connectors to transmit the converted electrical signals to each of the second electrical devices disposed within that particular rack. Also, since there is only one pass-through module per rack, relatively long electrical cables may be used to connect the pass-through module with each of or some of the second electrical devices disposed within the rack. These longer electrical cables may have larger gauges or diameters to transmit the electrical signal within the increased length, and they also may require signal conditioning circuitry, such as signal repeaters, to ensure signal integrity is maintained throughout the length of the cables.

Implementations of the present disclosure provide transceiver modules that may replace locally-powered pass-through modules in a system, while still transmitting optical signals from a first electrical device to one or more second electrical devices, and performing media conversion between electrical and optical signals. Implementations of the present disclosure may free volume within the system that may be used by additional electrical devices. Further, implementations of the present disclosure provide transceiver modules that may engage the first electrical device with one or more second electrical devices while minimizing the length of electrical cables employed, thereby reducing the gauge or diameter of such cabling, and removing additional signal conditioning circuitry. This may free additional volume within the electrical device system. Additionally, implementations of the present disclosure provide transceiver modules having cabling that can transmit optical signals, as well as electrical power. This may eliminate some power cabling within an electrical device, or within a rack of electrical devices. Further, multiple transceiver modules may be employed to connect the second electrical devices to the first electrical device, thereby allowing the number of second electrical devices disposed in a rack to be changed or adjusted, and avoid a situation where every second electrical device within a system is connected to the first electrical device through a single pass-through module. This may avoid a single point of failure situation within the electrical device system, such that only a portion of the second electrical devices within the system will cease to communicate with the first electrical device, should one of the transceiver modules experience a failure or a malfunction.

Figure 1:
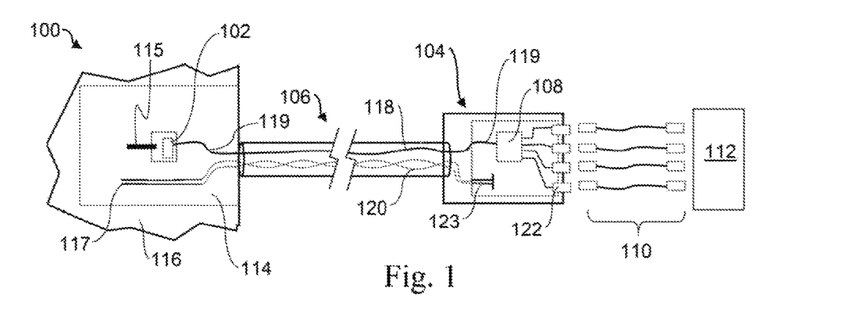
FIG. 1 is a schematic view of an example transceiver module.

Referring now to FIG. 1, a schematic view of an example transceiver module assembly 100 is illustrated. The transceiver module assembly 100 may include a first transceiver module 114, a second transceiver module 104, and an electro-optical cable 106 to connect the first transceiver module 114 to the second transceiver module 104. In some implementations, the first and second transceiver modules 114 and 104 may be disposed apart from each other, such that they are only engaged with each other through the electro-optical cable 106. The first transceiver module 114 may be engaged with a first electrical device 116 such that the first transceiver module 114 may electrically communicate with the first electrical device 116. Further, the second transceiver module 104 may be electrically engaged with a second electrical device 112. In some implementations, the first electrical device 116, the second electrical device 112, and the transceiver module assembly 100 may be part of a transceiver system.

In some implementations, the first electrical device 116 may be a computing device, such as a device having a processor or logic for the execution of machine readable instructions, for example. In some implementations, the computing device may be a data server, a central data server, or other data storage system. In further implementations, the first electrical device may be a network switch, a network switching hub, or a similar component having a network switch chip, such as a powered switch module. In other words, the first electrical device may connect other devices together on a computer network. The network switch, in some implementations, may be able to provide electrical power and electrical signals to other electrical devices. In yet further implementations, the network switch may be a core switch to connect with other switches, or edge switches. In some implementations, the network switch may have multiple ports to connect with multiple servers, switches, or other electrical or computing devices. In further implementations, the network switch may have 128 ports, with at least some of the ports having a high data rate capability, such as 25 gigabits per second (Gbps), for example.

The first transceiver module 114, as well as the second transceiver module 104, may, in some implementations, include components that may structurally support and electrically connect multiple electronic components. The first and second transceiver modules, 114 and 104, may, in some implementations, include components that may connect multiple electronic components with conductive pathways, which, in further implementations, may include copper. In yet further implementations, the first and second transceiver modules, 114 and 104, may include components that be made, at least partially, out of a non-conductive substrate with copper pathways etched onto the substrate. In some implementations, the non-conductive substrate may include silicon. In further implementations, the first and second transceiver modules, 114 and 104, might comprise a single-layer printed circuit board (PCB), or a multi-layer PCB in other implementations. In yet further implementations, the first transceiver module 114 may be removably or permanently disposed within the first electrical device 116, or integrated into the first electrical device 116. The first transceiver module 114 may, further, be integrated into the first electrical device 116 such that they share one or more electronic components or boards. In some implementations, the first transceiver module 114 may be disposed within the first electrical device 116 such that the electro-optical cable 106 may engage with the first transceiver module 114 through a faceplate of the first electrical device 116. In some implementations, the faceplate may include an electro-optical connector to engage with the electro-optical cable 106.

The first transceiver module 114 may include a first transceiver 102. The first transceiver 102 may be an electronic component having both a transmitter and a receiver within. In other words, the first transceiver 102 may include circuitry to both receive a signal and transmit a signal. The first transceiver 102 may further include circuitry to convert an electrical signal to an optical signal, and vice versa. In some implementations, the first transceiver 102 may include circuitry to receive multiple electrical or optical signals, transmit multiple electrical or optical signals, and convert multiple electrical signals to optical signals, and vice versa. The first transceiver 102 may receive an electrical signal from the first electrical device 116 through an electrical trace 115. The first transceiver 102 may use the transmitter within to convert the electrical signal from the first electrical device 116 to an optical signal 119 that corresponds to the electrical signal for transmission to the second transceiver module 104. This optical signal 119 may also be referred to as the converted optical signal. Further, the first transceiver 102 may receive an optical signal 119 from the electro-optical cable 106 and use the receiver within to convert the optical signal 119 back to an electrical signal and transmit the electrical signal to the first electrical device 116 through the electrical trace 115. Additionally, in some implementations, the first transceiver 102 may use electrical power from the first electrical device 116 to convert the electrical signal to the optical signal 119. The first transceiver 102 may receive electrical power from the first electrical device through one or more power traces 117.

Referring still to FIG. 1, the transceiver module assembly 100 may further include an electro-optical cable 106 to connect the first transceiver module 114 to the second transceiver module 104. The electro-optical cable 106 may be a cable that is capable of transferring or transmitting one or more electrical signals or electrical power, as well as one or more optical signals, from one end of the cable to another. The electro-optical cable 106 may include an outer sheath that may comprise an electrically insulating material. The electro-optical cable 106 may also include inner conduits, along which the electrical and the optical signals may be transmitted. In some situations, the electro-optical cable 106 may include wires 120 comprising an electrically conductive material to transmit the electrical signals or electrical power along the length of the cable. In some implementations, the wires 120 may comprise copper, carbon nanowire, or another suitable conductive material. In some implementations, the wires 120 of the electro-optical cable 106 may include at least a positive and a negative wire to carry and transmit electrical signals. Further, the electro-optical cable 106 may include optical fibers 118 to transmit the optical signals along the length of the cable. The optical fibers 118 may comprise tubes or waveguides made of glass, plastic, or another suitable material for transmitting optical signals. The electro-optical cable 106 may electrically and optically engage with both the first transceiver module 114 and the second transceiver module 104. In other words, the electro-optical cable 106 may be able to receive electrical and optical signals from both the first and second transceiver modules, 114, 104, as well as transmit electrical and optical signals to both the first and second transceiver modules 114, 104. The electro-optical cable 106 may be able to separately transmit electrical and optical signals, that is, transmit along separate conduits, to either of the first and second transceiver modules 114, 104. In some implementations, the electro-optical cable 106 may receive the optical signal 119 from the first transceiver 102. Additionally, the electro-optical cable 106 may receive electrical power from the first transceiver module 114, wherein the first transceiver module 114 may receive the electrical power from the first electrical device 116 through one or more power traces 117. Further, the electro-optical cable 106 may transmit the received optical signal 119 along the optical fibers 118 to the other end of the cable, which may be connected to the second transceiver module 104. Similarly, the electro-optical cable 106 may transmit the received electrical power along the wires 120 disposed within the cable 106 to the other end of the cable, which may be connected to the second transceiver module 104. It should be noted that, in some implementations, the electro-optical cable 106 may receive multiple optical signals 119 from the first transceiver 102 and transmit the multiple optical signals 119 along the optical fibers 118 to the second transceiver module 104.

The transceiver module assembly 100 may further include a second transceiver module 104. The second transceiver module 104 may include a second transceiver 108, and one or more electrical connectors 122 to connect the second transceiver module 104 to one or more second electrical devices 112. The second transceiver 108 may be similar in structure and/or in function to the first transceiver 102, described above. For example, the second transceiver 108 may be able to convert an optical signal to a corresponding electrical signal, and vice versa. Further, the second transceiver module 104, as described above, may electrically and optically engage with the electro-optical cable 106. The second transceiver module 104 may receive the transmitted optical signal 119, as well as the transmitted electrical power, from the electro-optical cable 106. The second transceiver 108 may receive the transmitted optical signal 119 and use the receiver within to convert the optical signal back to the corresponding electrical signal that was originally transmitted to the first transceiver 102 from the first electrical device 116. This electrical signal may also be referred to as the converted electrical signal. Further, the second transceiver 108 may receive an electrical signal from a second electrical device 112 and use the transmitter within to convert the electrical signal to an optical signal and transmit the optical signal to the first transceiver module 114 through the electro-optical cable 106. The second transceiver 108 may, in some implementations, receive multiple transmitted optical signals 119 and convert the multiple optical signals 119 back to the corresponding electrical signals. Further, the second transceiver module 104 may receive the transmitted electrical power from the wires 120 of the electro-optical cable 106 through one or more power traces 123. In some implementations, the second transceiver 108 may use the electrical power transmitted from the first transceiver module 114 to convert the transmitted optical signal or signals back to the electrical signal or signals, and vice versa. Therefore, in some implementations, the electro-optical cable 106 may transmit sufficient electrical power from the first transceiver module 114 to the second transceiver module 104 such that the second transceiver 108 can convert between electrical and optical signals using only the transmitted electrical power.

The second transceiver module 104 may further include one or more electrical connectors 122 to connect and electrically engage the second transceiver module 104 with one or more second electrical devices 112. One or more of the electrical connectors 122 may be engaged with the second transceiver 108, such that after the second transceiver 108 converts the one or more received optical signals 119 back to the electrical signals, the second transceiver 108 may transmit the converted electrical signals to the electrical connectors 122. The electrical connectors 122 may then transmit the one or more converted electrical signals to the one or more second electrical devices 112. Additionally, the second transceiver module 104 may have a different number of electrical connectors 122 than is shown in FIG. 1, in some implementations. Further, each electrical connector 122 may engage with a second electrical device 112 directly, or, in some implementations, one or more of the electrical connectors 122 may connect to and electrically engage with an electrical cable 110, which may then electrically engage with the respective second electrical device 112. Accordingly, the second transceiver module 104 may engage with a different number of electrical cables 110 than is shown in FIG. 1, in some implementations.

Each electrical cable 110 may be a conduit for electrical signals to be transferred between two electrical devices. As such, each electrical cable 110 may electrically engage with an electrical connector 122, as well as a second electrical device 112. In some implementations, one or more of the electrical cables 110 may engage with the second transceiver 108 directly, instead of engaging with an electrical connector 122. In such an implementation, the second transceiver module 104 may include electrically protective elements, such as a conductive shielding plates, to prevent electromagnetic signal interference with each signal within each electrical cable 110 and within the second transceiver module 104. Further, the electrically protective element may also act as a mechanically protective element, such as a strain relief, for the electrical cables 110. In yet further implementations, one or more of the electrical cables 110 may engage with another intermediary electrical component instead of a second electrical device 112 directly.

The second electrical device 112 may be a computing device, such as a device having a processor or logic for the execution of machine readable instructions, for example. In some implementations, the computing device may be a data server, a central data server, or other data storage system. In further implementations, the second electrical device 112 may be a network switch, a network switching hub, or a similar component having a network switch chip. In other words, the second electrical device 112 may connect other devices together on a computer network. Although FIG. 1 illustrates second electrical device 112 as a single component, element 112 may actually represent more than one second electrical device. Second electrical device 112 may be an array of multiple second electrical devices. Each of the second electrical devices 112 may be the same as the others, or may be a different type or style of electrical device, or may be a similar electrical device having different specifications or capacity. In some implementations, each electrical cable 110 may engage with a separate second electrical device 112.

Although only one direction of signal transmission is generally discussed above, it should be noted that the above described implementations may send signals in a bidirectional manner. In other words, the second transceiver 108 of the second transceiver module 104 may receive one or more electrical signals from one or more of the second electrical devices 112 through the electrical connectors 122. The second transceiver 108 may convert these one or more electrical signals to corresponding optical signals, which may then be transmitted by the electro-optical cable 106 to the first transceiver 102 of the first transceiver module 114.

The first transceiver 102 may then convert the one or more optical signals back to the corresponding one or more electrical signals, which may then be communicated or transmitted to the first electrical device 116. Note, the electrical-to-optical conversion of the signals by the second transceiver 108 may still be powered by the transmitted electrical power from the first electrical device 116. Similarly, the optical-to-electrical conversion of the signals by the first transceiver 102 may also be powered by the electrical power received from the first electrical device 116.

Figure 2:
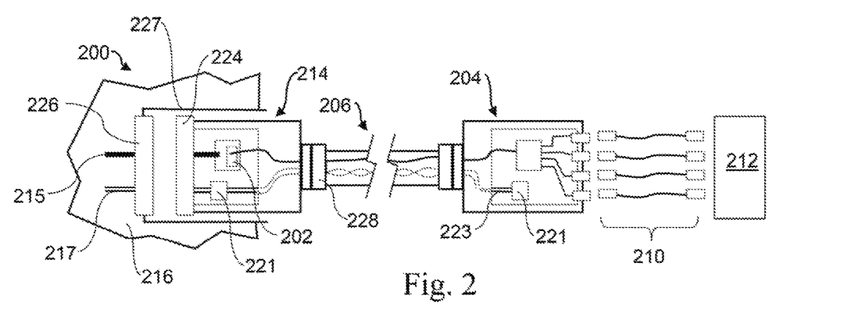
FIG. 2 is a schematic view of an example transceiver module.

Referring now to FIG. 2, a schematic view of an example transceiver module assembly 200 is illustrated. Example transceiver module assembly 200 may be similar to example transceiver module assembly 100. Further, the similarly named elements of example transceiver module assembly 200 may be similar in function and/or structure to the elements of example transceiver module assembly 100, as they are described above. Note, that although multiple elements of FIG. 2 may be shown and described together herein, implementations of the present disclosure may not need all of them together. The example transceiver module assembly 200 may comprise a first transceiver module 214 to engage with a first electrical device 216. In some implementations, the first transceiver module 214 is to engage with the first electrical device 216 through a transceiver cage 227 of the first electrical device 216. Further, the first transceiver module 214 may be modularly pluggable into the transceiver cage 227 of the first electrical device 216. In yet further implementations, the first transceiver module 214 may include a hot-plug electrical connector 224 to engage with a complementary hot-plug electrical connector 226 of the first electrical device 216.

The hot-plug electrical connector 224 and the complementary hot-plug electrical connector 226 may each be electrical connectors that are able to mechanically and electrically engage with one another. In some implementations, either of the connector 224, or the connector 226, may be a male electrical connector, with the other being a complementary female connector. While engaged with each other, the electrical connectors 224 and 226 may enable electrical communication between the first electrical device 216 and the first transceiver module 214, such that the first electrical device 216 is able to transmit or provide an electrical signal, as well as electrical power, to the first transceiver module 214. The first electrical device 216 may provide an electrical signal to the first transceiver module 214 through one or more electrical traces 215. Similarly, the first electrical device 216 may provide electrical power to the first transceiver module 214 through one or more power traces 217. The mechanical and electrical engagement of the electrical connectors 224 and 226 with each other may enable the electrical traces 215 and the power traces 217 to electrically communicate with the first transceiver module 214. The power traces 217, further, may provide enough power to the first transceiver module 214 through power pins of the electrical connectors 224 and 226 to power both the first transceiver 202, as well as a second transceiver of the second transceiver module 204. Additionally, hot-plug electrical connector 224 may be able to engage with the complementary hot-plug electrical connector 226 such that the first transceiver module 214 is hot-pluggable with the first electrical device 216. In this context, hot-pluggable may refer to the ability of the first transceiver module 214 to be engaged or disengaged from the first electrical device 216 without the function of the first electrical device 216 being stopped.

In some implementations, when the first transceiver module 214 is engaged with the first electrical device 216, a first transceiver 202 of the first transceiver module 214 may receive one or more electrical signals from the first electrical device 216 through the electrical traces 215. The first transceiver 202 may then convert the received electrical signals to corresponding optical signals, and transmit the optical signals to a second transceiver module 204 through an electro-optical cable 206. Additionally, the first transceiver module 214 may transmit electrical power received from the first electrical device 216 through the power traces 217 to the second transceiver module 204 through the electro-optical cable 206. The electro-optical cable 206 may have electrical wires and optical fibers to transmit the electrical power and the optical signals, respectively.

The electro-optical cable 206 may electrically and optically engage the first transceiver module 214 with the second transceiver module 204. The electro-optical cable 206 may be modularly pluggable into at least one of the first transceiver module 214 and the second transceiver module 204. In some implementations, the electro-optical cable 206 may be modularly pluggable into both the first and second transceiver modules 214 and 204. The electro-optical cable 206 may be modularly pluggable through an electro-optical connector 228, which may engage the electro-optical cable 206 with another electrical device such that the cable 206 and the device are in electrical and optical communication. In some implementations, the electro-optical cable 206 may include a first and second electro-optical connector 228 disposed on a first and second end of the electro-optical cable 206, respectively.

The example transceiver module assembly 200 may further comprise a power delivery device 221 disposed in each of the first transceiver module 214, and the second transceiver module 204. Each of the power delivery devices 221 may be respectively electrically engaged with the power traces 217 and 223, as well as the electrical wires of the electro-optical cable 206. The power delivery devices 221 may deliver power from the power traces 217 and 223 to other electrical components within the respective transceiver module. The power delivery devices 221 may act, in some implementations, as power converters. In such a situation, the power delivery device 221 of the first transceiver module 214 may adjust or convert an electrical power from the first electrical device 216. This adjustment or conversion of the electrical power may change the voltage or current of the electrical power for transmission through the electro-optical cable 206 to the second transceiver module 204. The power delivery device 221 of the second transceiver module 204 may receive the adjusted electrical power from the electro-optical cable 206, and adjust or convert the voltage or current of the electrical power again, in accordance with the needs of a second transceiver of the second transceiver module 204.

Additionally, the power delivery device 221 of the first transceiver module 214 may be able to send and/or modulate management signals on to the electrical wires of the electro-optical cable 206, and the power delivery device 221 of the second transceiver module 204 may be able to receive and/or demodulate the management signals from the electrical wires of the electro-optical cable 206, and vice versa. In other implementations, the transceiver module assembly 200 may have dedicated management wires that are separate from the electrical wires of the electro-optical cable 206, and the management signals may be sent over the dedicated wires. The first and second transceiver modules 214 and 204, in some implementations, may alternate sending and receiving management signals to and from each other. The management signals may enable the first and second electrical devices 216 and 212 (through the first and second transceiver modules 214 and 204, respectively) to communicate with each other and exchange status information, attributes, load data, or other information with each other. Other exchanged information may include, but is not limited to, number of attached second electrical devices 212, power requirements of the second transceiver module 204 or an attached second electrical device 212, and transceiver configurations. In further implementations, the exchanged data or information may enable the first electrical device 216 to decide to carry out, or to not carry out, an operation or function. This may include whether or not to send electrical power to the second electrical device 212 through the transceiver module assembly 200. Additionally, the power delivery device 221 of the first transceiver module 214 may have an over-current protection element, such as an electronic fuse, to prevent current overload by the power delivery device 221 of the second transceiver module 204. In further implementations, the exchanged information may enable the first and/or second transceiver modules to display a status or other attribute of the other transceiver module. Such a status or attribute may be displayed using a light-emitting diode (LED), or other indicator.

Figure 3:
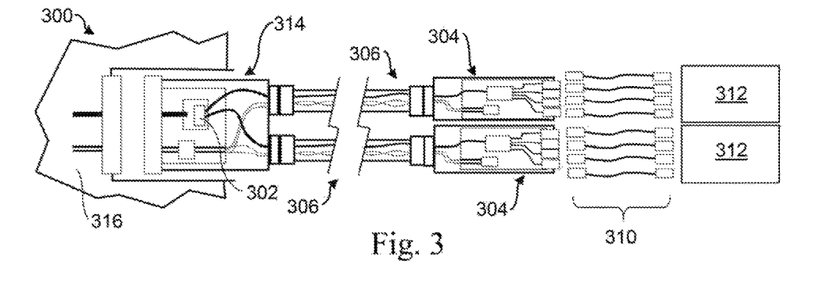
FIG. 3 is a schematic view of an example transceiver module.

Referring now to FIG. 3, a schematic view of an example transceiver module assembly 300 is illustrated. Example transceiver module assembly 300 may be similar to example transceiver module assembly 100 or 200. Further, the similarly named elements of example transceiver module assembly 300 may be similar in function and/or structure to the elements of example transceiver module assembly 100 or 200, as they are described above. In some implementations, the example transceiver module assembly 300 may comprise a first transceiver module 314 to engage with a first electrical device 316. The example transceiver module assembly 300 may further include multiple electro-optical cables 306, each to electrically and optically connect the first transceiver module 314 to a separate second transceiver module 304. Further, the first transceiver module 314 may have a first transceiver 302 to receive one or more electrical signals from the first electrical device 316, and to convert the electrical signals to optical signals. Each of the multiple electro-optical cables 306 may then transmit the optical signals to the respective second transceiver module 304. Additionally, the first transceiver module 314 may also receive an electrical power from the first electrical device 316. Each of the electro-optical cables 306 may also transmit, separately from the optical signals, the received electrical power from the first transceiver module 314 to the respective second transceiver module 304.

Each of the multiple second transceiver modules 304 may be electrically engaged with one or more second electrical devices 312. In some implementations, one or more of the second transceiver modules 304 may be electrically engaged with a second electrical device 312 through an electrical cable 310. It should be noted that the example transceiver module assembly 300 may include a number of electro-optical cables 306, second transceiver modules 304, electrical cables 310, and second electrical devices 312 that is different than shown in FIG. 3.

Figure 4A:
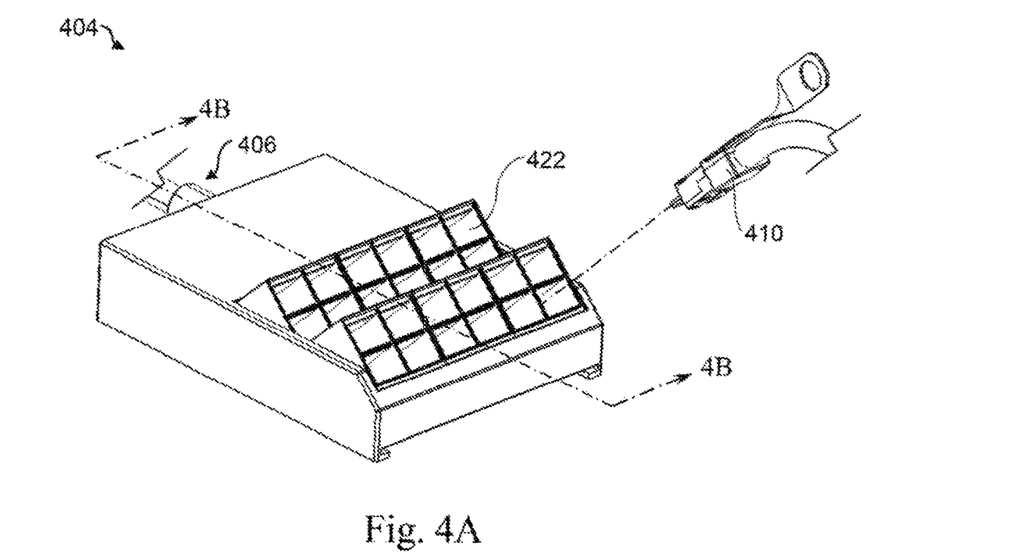
FIG. 4A is a perspective view of an example transceiver module.
Figure 4B:
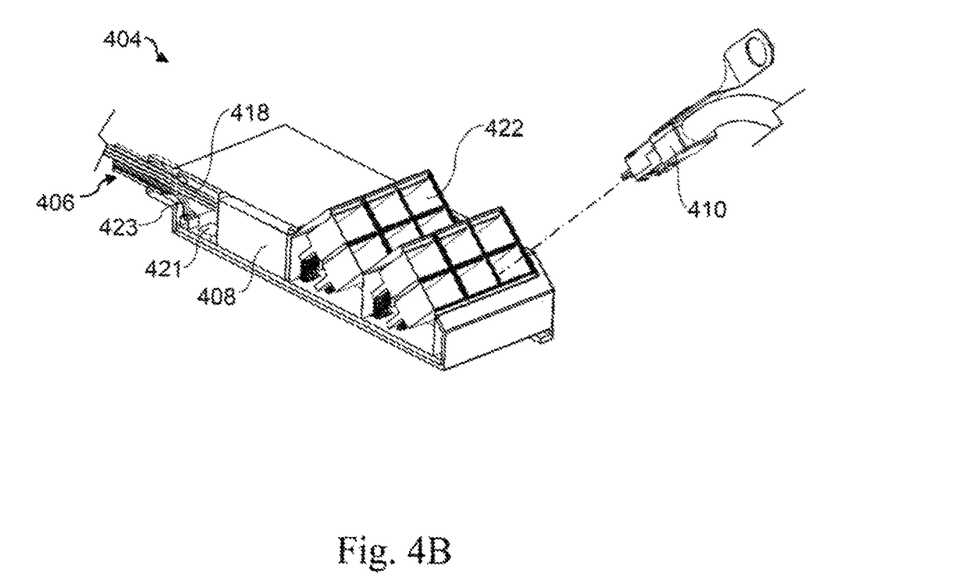
FIG. 4B is a cross-sectional, perspective view of an example transceiver module.

Referring now to FIGS. 4A-B, a perspective view and a cross-sectional perspective view of a partial example transceiver module assembly is illustrated, respectively. The example transceiver module assembly shown may be similar to example transceiver module assembly 100, 200, or 300. Further, the similarly named elements of the example transceiver module assembly shown may be similar in function and/or structure to the elements of example transceiver module assembly 100, 200, or 300, as they are described above. The example transceiver module assembly may include an example second transceiver module 404. The example second transceiver module 404 may be electrically and optically engaged with a first transceiver module (not shown) by an electro-optical cable 406. The electro-optical cable 406 may transmit electrical power along electrical wires from the first transceiver module to power traces 423 of the second transceiver module. The electrical power, or management signals therein, may also be received by a management controller 421, in some implementations. Additionally, the electro-optical cable 406 may transmit one or more optical signals along optical fibers 418 from the first transceiver module to the example second transceiver module 404, and vice versa.

The optical fibers 418 may transmit optical signals to and from a second transceiver 408. The second transceiver 408 may convert the optical signals received to corresponding electrical signals. The example second transceiver module 404 may then provide the converted electrical signals to one or more of electrical connectors 422. Each electrical connector 422 may engage with an electrical cable 410, to transmit electrical signals from the second transceiver 408 to a second electrical device (not shown), and vice versa. Each electrical cable 410 may be modularly pluggable with each of the electrical connectors 422, in some implementations. Note, only the portion of the electrical cable 410 that is to engage with the electrical connectors 422 is shown. Electrical signals received from a second electrical device by the second transceiver may be converted from electrical to corresponding optical signals, and transmitted from the second transceiver module 404 to the first transceiver module by the optical fibers 418 of the electro-optical cable 406.

What is claimed is:

1. A transceiver module assembly, comprising:
   a first transceiver module engaged with a first electrical device and including a first transceiver and a first power delivery device, wherein the first electrical device is to communicate with a plurality of second electrical devices via the transceiver module assembly,
   wherein the first transceiver module is to receive an electrical signal and electrical power from the first electrical device, and wherein the first transceiver is to convert the electrical signal to an optical signal;
   a second transceiver module, the second transceiver module comprising:
      a housing
      a non-conductive substrate;
      power traces;
      a second transceiver;
      a second power delivery device engaged with the power traces, wherein the second power delivery device is configured to:
         deliver power to the second transceiver; and
         send management signals over power wires of an electro-optical cable to the first power delivery device, and receive management signals over the power wires from the first power delivery device;
      a plurality of electrical connectors, each of the plurality of connectors configured to engage with an electrical cable to connect the second transceiver module to a respective one of the plurality of second electrical devices;
   wherein the second transceiver is to convert the optical signal back to the electrical signal, and
   wherein the first transceiver and the second transceiver are bidirectional transceivers, such that both the first and second transceivers can convert electrical signals to optical signals, as well as optical signals to electrical signals; and
   the electro-optical cable, wherein the electro-optical cable is to connect the first transceiver module to the second transceiver module such that the electro-optical cable can separately transmit the optical signal and the electrical power from the first transceiver module to the second transceiver module,
   wherein the electro-optical cable is to transmit sufficient electrical power from the first transceiver module to the second transceiver module such that the second transceiver can convert the optical signal back to the electrical signal, wherein the second transceiver module receives the transmitted electrical power from the electro-optical cable through the power traces, and
   wherein the second transceiver module is to provide the converted electrical signal to one of the plurality of second electrical devices over an electrical cable engaged to one of the plurality of connectors.

2. The transceiver module assembly of claim 1, wherein each of the plurality of second electrical devices comprises a server.

3. The transceiver module assembly of claim 2, wherein the second transceiver module is to provide the converted electrical signal to each of the plurality of servers over a respective cable coupled to a respective one of the plurality of connectors.

4. The transceiver module assembly of claim 2, wherein the electro-optical cable is modularly pluggable into at least one of the first transceiver module and the second transceiver module.

5. The transceiver module assembly of claim 2, further comprising multiple electro-optical cables,
   wherein each electro-optical cable is to connect the first transceiver module with a separate second transceiver module, each of the separate second transceiver modules comprising:
      a housing;
      a non-conductive substrate;
      power traces;
      a separate transceiver;
      a separate power delivery device engaged with the power traces of the separate second transceiver module, wherein the separate power delivery device is configured to:
         deliver power to the separate transceiver; and
         send management signals over power wires of an electro-optical cable to the first power delivery device, and receive management signals over power wires of an electro-optical cable from the first power delivery device;
      a separate plurality of electrical connectors, each of the separate plurality of connectors configured to engage with an electrical cable to connect the separate transceiver module to a respective one of a plurality of second electrical devices, and
   wherein each electro-optical cable is to transmit the optical signal and electrical power from the first transceiver module to the separate second transceiver module.

6. The transceiver module assembly of claim 2, wherein the first electrical device is a powered switch module.

7. The transceiver module assembly of claim 6, wherein the first transceiver module is modularly pluggable into a transceiver cage of the powered switch module, such that the first transceiver module can receive the electrical signal and the electrical power from the powered switch module when the first transceiver module is plugged into the transceiver cage,
 wherein the transceiver module assembly receives sufficient electrical power from the powered switch module such that the first and second transceivers can each convert optical signals to electrical signals and electrical signals to optical signals.

8. A transceiver module assembly, comprising:
 a first transceiver module to receive an electrical signal and electrical power from a first electrical device, wherein the first electrical device is to communicate with a plurality of second electrical devices via a transceiver module assembly,
 wherein the first transceiver module includes a first transceiver to convert the electrical signal to an optical signal, and a first power delivery device;
 a second transceiver module disposed apart from the first transceiver module, the second transceiver module comprising:
  a housing
  a non-conductive substrate;
  power traces;
  a second transceiver to convert the optical signal back to the electrical signal;
  a second power delivery device engaged with the power traces, wherein the second power delivery device is configured to:
   deliver power to the second transceiver; and
   send management signals over power wires of an electro-optical cable to the first power delivery device, and receive management signals over the power wires from the first power delivery device; and
  a plurality of electrical connectors, each of the plurality of electrical connectors configured to engage with an electrical cable to connect the second transceiver module to a respective one of the plurality of second electrical devices,
 wherein the first transceiver and the second transceiver are bidirectional transceivers, such that both the first and second transceivers can convert electrical signals to optical signals, as well as optical signals to electrical signals, and
 wherein the second transceiver is to transmit a converted electrical signal to each of the plurality of second electrical devices over an electrical cable engaged to one of the plurality of connectors; and
 the electro-optical cable, comprising:
  optical fibers to transmit the optical signal from the first transceiver module to the second transceiver module;
  the power wires, wherein the power wires are to transmit the electrical power from the first transceiver module to the second transceiver module, wherein the second transceiver module receives the transmitted electrical power from the electro-optical cable through the power traces; and
  a first and second electro-optical connector disposed on a first and second end of the electro-optical cable, respectively,
  wherein the first and second electro-optical connectors are to both electrically and optically engage the electro-optical cable with the first and second transceiver modules, respectively.

9. The transceiver module assembly of claim 8, wherein the first transceiver module further includes a hot-plug electrical connector to engage with a complementary hot-plug electrical connector on the first electrical device such that the first transceiver module is hot-pluggable with the first electrical device,
 wherein the first electrical device is to transmit sufficient electrical power to the first transceiver module through power pins of the hot-plug connector and the complementary hot-plug connector such that the first and second transceivers can each convert optical signals to electrical signals and electrical signals to optical signals.

10. A transceiver system, comprising:
 a powered switch module having a faceplate;
 a plurality of servers to receive electrical communication signals from the powered switch module via a transceiver module assembly; and
 the transceiver module assembly, including:
  a first transceiver module engaged with the powered switch module and to receive an electrical signal and electrical power from the powered switch module and convert the electrical signal to an optical signal using a first transceiver, the first transceiver module comprising a first power delivery device;
  a second transceiver module to receive the optical signal from the first transceiver module and convert the optical signal back to the electrical signal using a second transceiver, the second transceiver module comprising:
   a housing;
   a non-conductive substrate;
   power traces;
   a transceiver;
   a second power delivery device engaged with the power traces, wherein the second power delivery device is configured to:
    deliver power to the second transceiver; and
    send management signals over power wires of an electro-optical cable to the first power delivery device, and receive management signals over the power wires from the first power delivery device; and
   a plurality of electrical connectors, each of the plurality of electrical connectors configured to engage with an electrical cable to connect the second transceiver module to a respective one of the plurality of servers;
  wherein the first transceiver and the second transceiver are bidirectional transceivers, such that both the first and second transceivers can convert electrical signals to optical signals, as well as optical signals to electrical signals,
  the electro-optical cable, wherein the electro-optical cable is to separately transmit the optical signal and the electrical power from the first transceiver module to the second transceiver module,
  wherein the electro-optical cable is to transmit sufficient electrical power from the first transceiver module to the second transceiver module such that the second transceiver module may convert the optical signal back to the electrical signal, wherein the second transceiver module receives the transmitted electrical power from the electro-optical cable through the power traces; and
  a plurality of electrical cables, each of the plurality of cables to connect a connector of the plurality of electrical connectors of the second transceiver module to a respective one of the plurality of servers,
wherein each of the plurality of electrical cables is to transmit a converted electrical signal from the second transceiver module to a respective one of the plurality of servers.

11. The transceiver system of claim 10, wherein the first transceiver module is integrated with the powered switch module and disposed behind the faceplate, and
wherein the electro-optical cable is modularly pluggable into the first transceiver module through an electro-optical connector disposed on the faceplate.

12. The transceiver module assembly of claim 1, wherein the management signals sent or received over the power wires by the second power delivery device: comprise information including one or more of: a number of the plurality of second electrical devices that are attached, power requirements of the second transceiver module, and power requirements of one of the plurality of second electrical devices.

13. The transceiver module assembly of claim 12, wherein the management signals sent or received over the power wires by the second power delivery device: comprise information including a number of the plurality of second electrical devices that are attached.

14. The transceiver module assembly of claim 1, wherein the first power delivery device comprises an over-current protection element configured to prevent current overload by the power delivery device of the second transceiver module.

* * * * *